US007856717B2

(12) United States Patent
Kwon et al.

(10) Patent No.: US 7,856,717 B2
(45) Date of Patent: Dec. 28, 2010

(54) METHOD OF MANUFACTURING INKJET PRINT HEAD

(75) Inventors: Myong Jong Kwon, Suwon-si (KR); Sung Joon Park, Suwon-si (KR); Jin Wook Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 488 days.

(21) Appl. No.: 12/033,222

(22) Filed: Feb. 19, 2008

(65) Prior Publication Data

US 2008/0313900 A1 Dec. 25, 2008

(30) Foreign Application Priority Data

Jun. 21, 2007 (KR) ..................... 10-2007-0061066

(51) Int. Cl.
*B23P 17/00* (2006.01)
*G01D 15/00* (2006.01)

(52) U.S. Cl. .......................... 29/890.1; 29/830; 29/831; 29/832; 29/846; 29/852; 216/27

(58) Field of Classification Search ................ 29/890.1, 29/830, 831, 832, 846, 847, 852; 216/27, 216/43, 46; 430/320; 347/50, 54, 57, 87, 347/68–70
See application file for complete search history.

(56) References Cited

U.S. PATENT DOCUMENTS 4,558,333 A * 12/1985 Sugitani et al. ............... 347/65
5,945,260 A * 8/1999 Miyagawa et al. .......... 430/320
6,406,607 B1 * 6/2002 Hirsh et al. ................... 205/69
6,719,410 B2 * 4/2004 Shingai et al. ................ 347/70
2004/0036744 A1 2/2004 Cho et al.

FOREIGN PATENT DOCUMENTS

KR 10-517515 9/2005

OTHER PUBLICATIONS

Chinese Office Action issued Nov. 13, 2009 in CN Application No. 200810085041.

* cited by examiner

*Primary Examiner*—Derris H Banks
*Assistant Examiner*—Tai Nguyen
(74) *Attorney, Agent, or Firm*—Stanzione & Kim, LLP

(57) ABSTRACT

A method of manufacturing an inkjet print head simplifies a manufacturing process and uniformly forms an ink channel and includes forming a chamber layer using a low-speed optical hardening material on a substrate, hardening regions of the chamber layer for the wall of an ink channel by selectively exposing the chamber layer to light, forming a nozzle layer using a high-speed optical hardening material, having a higher optical reaction speed than that of the low-speed optical hardening material, on the chamber layer, hardening regions of the nozzle layer other than nozzles by selectively exposing the nozzle layer to light, and forming the ink channel and the nozzles by developing the chamber layer and the non-exposed regions of the nozzle layer.

20 Claims, 5 Drawing Sheets

METHOD OF MANUFACTURING INKJET PRINT HEAD

CROSS-REFERENCE TO RELATED APPLICATIONS

This application claims priority under 35 U.S.C. §119(a) from Korean Patent Application No. 2007-0061066, filed Jun. 21, 2007, in the Korean Intellectual Property Office, the disclosure of which is incorporated herein by reference in its entirety.

BACKGROUND OF THE INVENTION

1. Field of the Invention

The present general inventive concept relates to a method of manufacturing an inkjet print head, and more particularly, to a method of manufacturing an inkjet print head, in which a manufacturing process is simplified and an ink channel is uniformly formed.

2. Description of the Related Art

Inkjet print heads are apparatuses, which discharge minute ink droplets onto a paper so as to print an image. Among methods for operating the inkjet print heads, a method, in which an ink in a chamber is heated so as to generate air bubbles and is discharged onto a paper through nozzles using the expansive force of the bubbles, has been known.

Korean Patent Registration No. 10-0517515 discloses an inkjet print head and a method for manufacturing the same. Such an inkjet print head includes a chamber layer, which is stacked on a substrate so as to form an ink chamber, and a nozzle layer, which is formed on the chamber layer. Nozzles for discharging an ink are formed in the nozzle layer. A heater for heating the ink in the ink chamber and a leading layer for supplying current to the heater are provided on the substrate. Hereinafter, the method for manufacturing the inkjet print head will be described.

First, in order to form chamber layer, a negative photoresist is applied to the substrate, on which the heater and electrodes are formed, and then the ink chamber is formed in the chamber layer by a photolithography process. After the chamber layer is formed, a sacrificial layer is applied to the chamber layer, and the upper surfaces of the sacrificial layer and the chamber layer are leveled by chemical mechanical polishing (CMP). In order to form the nozzle layer, a negative photoresist is applied to the leveled sacrificial and chamber layers, and nozzles are formed in the nozzle layer by a photolithography process.

Since the sacrificial layer is applied to the upper surface of the chamber layer, and the upper surfaces of the sacrificial layer and the chamber layer are leveled by CMP, the above method has a complicated manufacturing process. This complicated manufacturing process increases factors of failure and lowers productivity.

Particularly, since the upper surface of the chamber layer as well as the upper surface of the sacrificial layer is polished by CMP and there are deviations of thicknesses of the chamber layer and the sacrificial layer due to a difference of hardnesses between the chamber layer and the sacrificial layer, the above method has a difficulty in uniformly forming the chamber layer and the nozzle layer. Further, burrs may be formed at inlets of the nozzles due to the chemical or optical reaction of the sacrificial layer and the nozzle layer. These problems may obstruct the formation of a uniform ink channel.

SUMMARY OF THE INVENTION

The present general inventive concept provides a method of manufacturing an inkjet print head, in which a manufacturing process is simplified and an ink channel is uniformly formed.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of manufacturing an inkjet print head, the method including forming a chamber layer using a low-speed optical hardening material on a substrate, hardening regions of the chamber layer for the wall of an ink channel by selectively exposing the chamber layer to light, forming a nozzle layer using a high-speed optical hardening material, having a higher optical reaction speed than that of the low-speed optical hardening material, on the chamber layer, hardening regions of the nozzle layer other than nozzles by selectively exposing the nozzle layer to light, and forming the ink channel and the nozzles by developing the chamber layer and the non-exposed regions of the nozzle layer.

The chamber layer may be formed by a spin coating method using the low-speed optical hardening material in a liquid state; and the nozzle layer may be formed by attaching the high-speed optical hardening material in a solid thin film state to the upper surface of the chamber layer.

The low-speed optical hardening material may include a sensitizer requiring a light exposure amount of 100~400 $mJ/cm^2$ to sensitize the low-speed optical hardening material with a thickness of 1 μm; and the high-speed optical hardening material may include a sensitizer requiring a light exposure amount of approximately 8~23 $mJ/cm^2$ to sensitize the high-speed optical hardening material with a thickness of 1 μm.

The low-speed optical hardening material may be a liquid material including one selected from the group consisting of photosensitive polymide, photosensitive polyamide, and photosensitive epoxy, the high-speed optical hardening material may be a solid material including one selected from the group consisting of photosensitive polymide, photosensitive polyamide, and photosensitive epoxy, and the low-speed optical hardening material and the high-speed optical hardening material may have different sensitizer contents.

The method may further include forming an ink supply hole by etching the rear surface of the substrate.

The method may further include forming an insulating layer on the substrate, forming a heater layer and a lead layer on the insulating layer, and forming a protective layer to protect the heater layer and the lead layer.

The foregoing and/or other aspects and utilities of the present general inventive concept may be achieved by providing a method of manufacturing an inkjet print head, the method including forming a chamber layer using a low-speed optical hardening material on a substrate, forming a nozzle layer using a high-speed optical hardening material having a higher optical reaction speed than an optical reaction speed of the low-speed optical hardening material, on the chamber layer, and forming an ink channel and nozzles on the chamber layer and the nozzle layer.

The method may further include hardening regions of the chamber layer to form a wall of the ink channel by selectively exposing the chamber layer to light.

The forming of the ink channel may include forming the ink channel and the nozzles by developing the chamber layer.

The method may further include hardening regions of the nozzle layer other than the nozzles by selectively exposing the nozzle layer to light.

The forming of the nozzles may include forming the nozzles by developing non-exposed regions of the nozzle layer.

The low-speed optical hardening material may include a first sensitizer having a first light exposure amount to sensitize the low-speed optical hardening material with a first thickness, and the high-speed optical hardening material may include a second sensitizer having a second light exposure amount smaller than the first light exposure amount to sensitize the high-speed optical hardening material with a second thickness.

The first thickness and the second thickness may be substantially same.

The low-speed optical hardening material may require a first energy to sensitize the low-speed optical hardening material with a first thickness, and the high-speed optical hardening material may require a second energy lower than the first energy to sensitize the high-speed optical hardening material with a second thickness.

The first thickness and the second thickness may be substantially same.

The ink channel and the nozzles may be formed without forming a sacrificial layer on the chamber layer.

The ink channel may be formed without forming a sacrificial layer on the chamber layer and without polishing a surface of the sacrificial layer.

The method may further include hardening regions of the chamber layer to form a wall of the ink channel by selectively exposing the chamber layer to light, and hardening regions of the nozzle layer other than the nozzles by selectively exposing the nozzle layer to light, and one of the selectively exposing of the chamber layer and the selectively exposing of the nozzle layer may not interfere with the other one of the selectively exposing of the chamber layer and the selectively exposing of the nozzle layer.

The method may further include hardening regions of the chamber layer to form a wall of the ink channel by selectively exposing the chamber layer to light, and hardening regions of the nozzle layer other than the nozzles by selectively exposing the nozzle layer to light, and the selectively exposing of the chamber layer and the selectively exposing of the nozzle layer may be prevented from interfering with each other according to characteristics of the low-speed optical hardening material and the high-speed optical hardening material.

The method may further include hardening regions of the chamber layer to form a wall of the ink channel by selectively exposing the chamber layer to light, and hardening regions of the nozzle layer other than the nozzles by selectively exposing the nozzle layer to light, and an optical reaction of the chamber layer may not occur when the nozzle layer is exposed to the light.

BRIEF DESCRIPTION OF THE DRAWINGS

These and/or other aspects and utilities of the present general inventive concept will become apparent and more readily appreciated from the following description of the embodiments, taken in conjunction with the accompanying drawings in which.

DETAILED DESCRIPTION OF THE PREFERRED EMBODIMENTS

Figure 1:
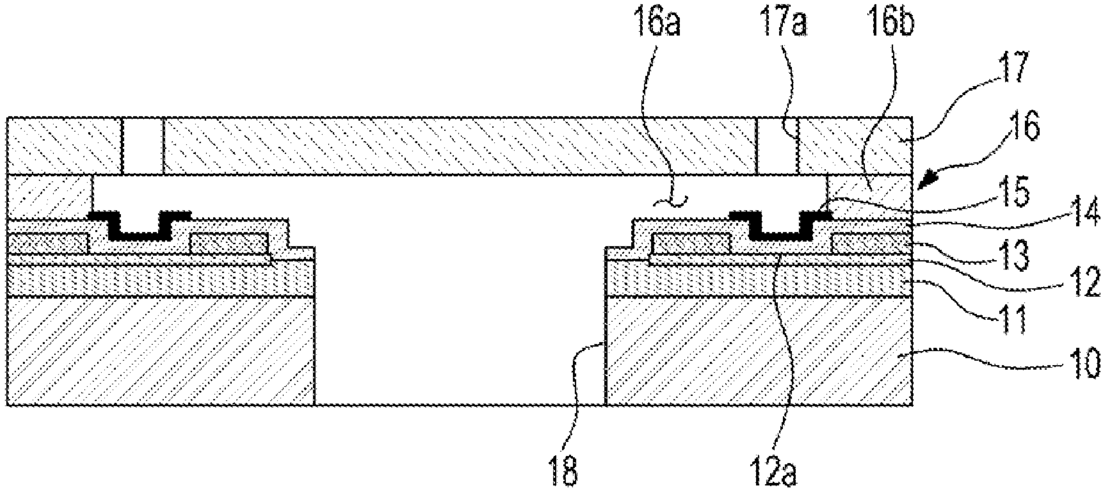
FIG. 1 is a schematic sectional view illustrating an inkjet print head according to an embodiment of the present general inventive concept.

Reference will now be made in detail to an embodiment of the present general inventive concept, examples of which is illustrated in the accompanying drawings, wherein like reference numerals refer to like elements throughout. The embodiments are described below in order to explain the present general inventive concept by referring to the figures.

FIG. 1 is a sectional view illustrating an inkjet print head according to an embodiment of the present general inventive concept. Referring to FIG. 1, the inkjet print head includes a substrate 10, a chamber layer 16 stacked on the substrate 10 to define an ink chamber **16*a* with a chamber wall 16*b*, and a nozzle layer 17 stacked on the chamber layer 16. The inkjet print head further includes a heater layer 12 provided between the chamber layer 16 and the substrate 10 to heat an ink supplied into the ink chamber 16*a* through a manifold 18 formed in the substrate 10, an insulating layer 11 to prevent thermal and/or electric insulating effects between the heater layer 12 and the substrate 10, a lead layer 13 provided on the heater layer 12, and a protective layer 14 to cover an upper surface of the lead layer 13**.

The heater layer 12 is formed by depositing a heat generating resistant material, such as nitride tantalum (TaN) or tantalum-aluminum alloy, on the upper surface of the insulating layer 11. When power is applied to the inkjet print head, heat generating regions **12*a* of the heater layer 12 under the ink chamber 16*a* heat the ink in the ink chamber 16*a*. This heating is achieved such that air bubbles are formed in the ink in the ink chamber 16*a* and the ink in the ink chamber 16*a* is discharged through nozzles 17*a* of the nozzle layer 17** by means of the expansion of the bubbles.

The lead layer 13 forms a wiring as an electrical connection to apply power to the heat generating regions **12*a* of the heater layer 12. The lead layer 13 is formed by depositing a metal having a good conductivity, such as aluminum (Al), and the lead layer 13** formed by the deposition forms the wiring having a designated shape by a photolithography process and an etching process.

The protective layer 14 prevents the heater layer 12 and the lead layer 13 from oxidizing and contacting directly the ink, thus protecting the heater layer 12 and the lead layer 13. The protective layer 14 is made of silicon nitride (SiNx) deposited on upper surfaces of the heater layer 12 and the lead layer 13. An anti-cavitation layer 15 is formed on the upper surfaces of the heat generating regions **12*a* of the heater layer 12. The anti-cavitation layer 15 protects the heater layer 12 from a cavitation force, which occurs when the air bubbles in the ink chamber 16*a* contract, and then disappears, and prevents the heater layer 12 from being corroded by the ink. The anti-cavitation layer 15 is formed by depositing tantalum (Ta) on the upper surface of the protective layer 14** to a designated thickness.

FIGS. 2 to 5 illustrate a method of manufacturing an inkjet print head according to an embodiment of the present general inventive concept will be described with reference to FIG. 1.

Figure 2:
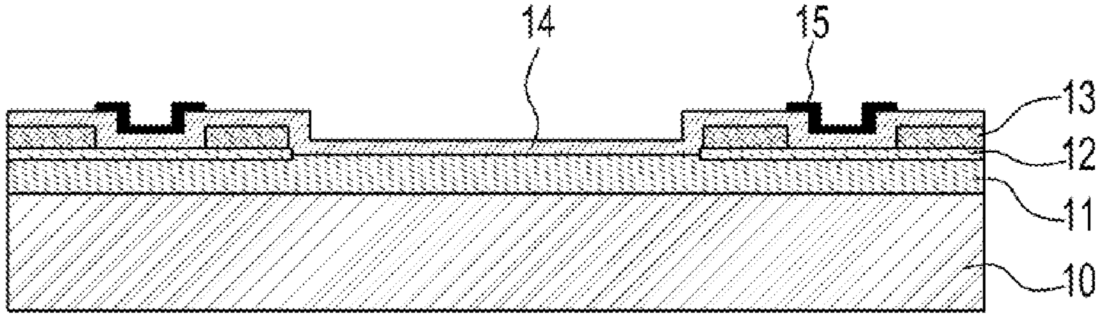
FIGS. 2 to 5 are sectional views illustrating a method of manufacturing an inkjet print head according to an embodiment of the present general inventive concept.

FIG. 2 illustrates a state in which the insulating layer 11, the heater layer 12, the lead layer 13, the protective layer 14, and the ant-cavitation layer 15 are formed on an upper surface of the substrate 10. A silicon wafer, which is widely applied to fabricate a semiconductor element and is proper for mass-production, is used as the substrate 10. The insulating layer 11 is formed by depositing a silicon oxide (SiO2) on the upper surface of the substrate 10 to a designated thickness. The heater layer 12 is formed by depositing a heat generating resistant material, such as nitride tantalum (TaN), tantalum-aluminum alloy (TaAl), nitride titanium (TiN), or tungsten silicide, on an upper surface of the insulating layer 11.

The lead layer 13 is formed by depositing a metal having a good conductivity, such as aluminum (Al), on an upper surface of the heater layer 12 by a vacuum deposition method, and then by patterning the obtained metal layer by a photolithography process and an etching process. The protective layer 14 is formed by depositing silicon nitride (SiNx) on an upper surfaces of the heater layer 12, the lead layer 13, and a portion of the insulating layer 11 according to plasma enhanced chemical vapor deposition (PECVD). The anti-cavitation layer 15 is formed by depositing tantalum (Ta) on an upper surface of the protective layer 14 (above the heat generating regions of the heater layer) and then by patterning the obtained tantalum layer by the photolithography process and the etching process so as to leave portions of the tantalum layer only above the heat generating regions 12*a* of the heater layer 12.

Figure 3:
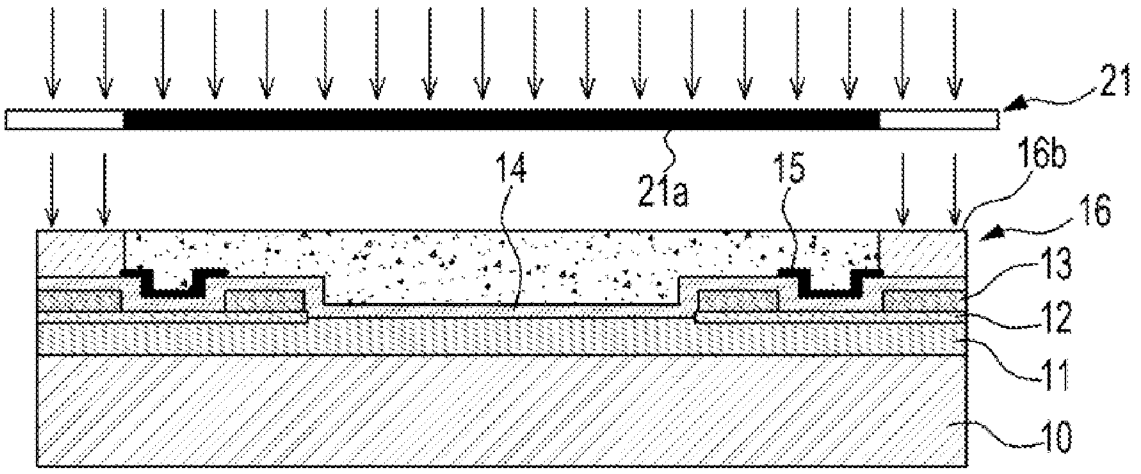

After the protective layer 14 and the anti-cavitation layer 15 are formed, the chamber layer 16 is formed on the upper surfaces of the protective layer 14 and the anti-cavitation layer 15, as illustrated in FIG. 3. In order to form the chamber layer 16, a low-speed optical hardening material in a liquid state is applied to the upper surfaces of the protective layer 14 and the anti-cavitation layer 15 to a thickness of 5~30 μm by a spin coating method, and then is soft-baked at a low temperature so as to remove a solvent contained in the low-speed optical hardening material. The baked chamber layer 16 is selectively exposed to light, thereby hardening regions of the chamber layer 16 for the chamber wall 16*b* to define the ink chamber 16*a*. Here, a photo mask 21 provided with a channel pattern 21*a* for closing the region of the chamber layer 16 for the ink chamber 16*a* is used. The photo mask 21 does not harden the non-exposed region of the chamber layer 16 for the ink chamber 16*a*, but hardens the exposed regions of the chamber layer 16 for the wall 16*b*.

The low-speed optical hardening material to form the chamber layer 16 has a lower film speed than that of an optical hardening material for forming the nozzle layer 17, which will be described later, and thus requires a high energy for sensitization. The low-speed optical hardening material includes one selected from the group consisting of photosensitive polymide, photosensitive polyamide, and photosensitive epoxy. Like a general negative photoresist in a liquid state, the low-speed optical hardening material includes a sensitizer, a solvent, and other additives. The sensitizer is reacted with light and thus produces a photo-chemical reaction, thereby converting the structure of a substance. Accordingly, the film speed of the low-speed optical hardening material is varied according to the content of the sensitizer. In this embodiment, the low-speed optical hardening material is controlled such that a light exposure amount of approximately 100~400 mJ/cm$^2$ is required to sensitize the low-speed optical hardening material with a thickness of 1 μm. It may be achieved by adjusting the content of the sensitizer, but is not limited thereto.

Figure 4:
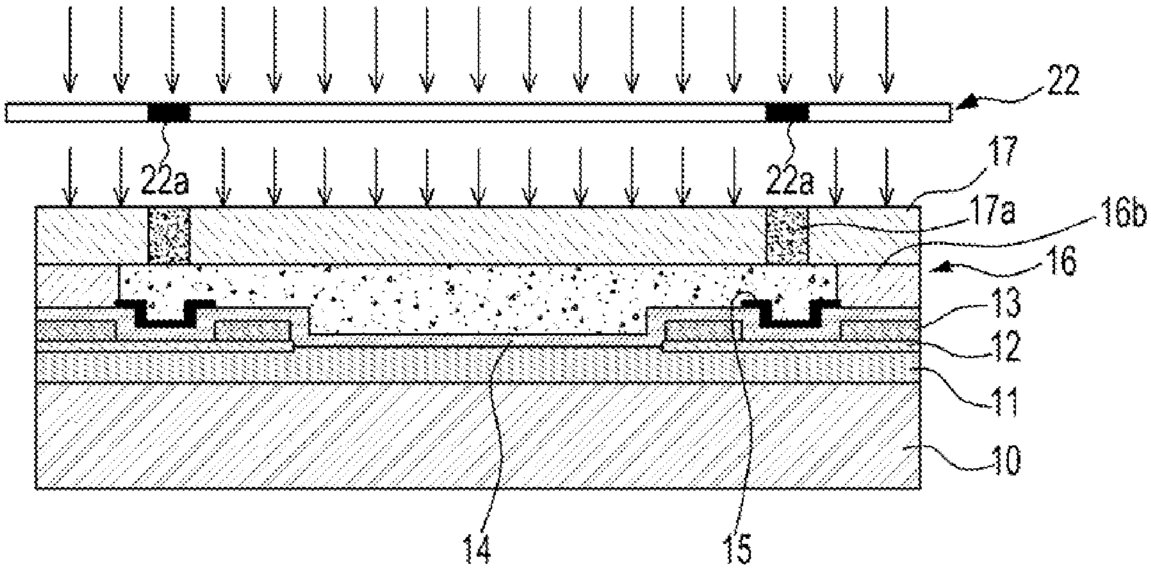

After the chamber layer 14 is formed, a high-speed optical hardening material, which produces a photo reaction more rapidly than the low-speed optical hardening material, is stacked on the upper surface of the chamber layer 16, and produces the nozzle layer 17, as shown in FIG. 4. Then, the nozzle layer 17 is selectively exposed to light, and thus regions of the nozzle layer 17 other than the nozzles 17*a* are hardened. Here, a photo mask 22 provided with a channel pattern 22*a* for closing regions of the nozzle layer 17 for the nozzles 17*a* is used. The photo mask 22 does not harden the regions of the nozzle layer 17 for the nozzles 17*a*, but hardens the regions of the nozzle layer 17 other than the nozzles 17*a*.

In order to form the nozzle layer 17, a high-speed optical hardening material in a solid thin film state, such as a dry film resist (DFR), is attached to the upper surface of the chamber layer 16. The high-speed optical hardening material in the solid thin film state includes one selected from the group consisting of photosensitive polymide, photosensitive polyamide, and photosensitive epoxy. The high-speed optical hardening material further includes a sensitizer to control a photo reaction. The high-speed optical hardening material is controlled such that a light exposure amount of approximately 8~23 mJ/cm$^2$ is required to sensitize the high-speed optical hardening material with a thickness of 1 μm. The control of the film speed of the high-speed optical hardening material is achieved by adjusting the content of the sensitizer.

In the same manner as the chamber layer 16, the nozzle layer 17 may be formed by a spin coating method using an optical hardening material in a liquid state. However, in the case that the nozzle layer 17 is formed by this method, the material of the chamber layer 16 and the material of the nozzle layer 17 can be mixed due to a solvent of the high-speed optical hardening material, and thus a boundary between the chamber layer 16 and the nozzle layer 17 may be vanished. Then, it is not easy to correctly form the ink chamber 16*a* and the nozzles 17*a*. Accordingly, the nozzle layer 17 may be formed by attaching a high-speed optical hardening material in a solid state to the upper surface of the chamber layer 16.

As described above, in case that the low-speed optical hardening material is controlled such that a light exposure amount of approximately 100~400 mJ/cm$^2$ is required to sensitize the low-speed optical hardening material with a thickness of 1 μm and the high-speed optical hardening material is controlled such that a light exposure amount of approximately 8~23 mJ/cm$^2$ is required to sensitize the high-speed optical hardening material with a thickness of 1 μm, the energy for sensitizing the chamber layer 16 is approximately 5~54 times the energy for sensitizing the nozzle layer 17. Preferably, the energy for sensitizing the chamber layer 16 is approximately 15~20 times the energy for sensitizing the nozzle layer 17. That is, the sensitizing of the chamber layer 16 requires a high energy and a long time, compared with the sensitizing of the nozzle layer 17. Accordingly, even when the nozzle layer 17 is exposed to light, as shown in FIG. 4, no photo reaction of the chamber layer 16 occurs. That is, although the non-exposed region of the chamber layer 16 is exposed to light during the exposure of the nozzle layer 17 to light, this region made of the low-speed optical hardening material is not substantially sensitized. The reason is that the sensitizing of the low-speed optical hardening material requires energy several tens of times the sensitizing of the high-speed optical hardening material.

Through the above operations, the ink chamber 16*a* and the nozzles 17*a* can be uniformly formed. Further, it is possible to form the chamber layer 16 and the nozzle layer 17 to uniform thicknesses and to prevent burrs on the nozzles 17*a*. Particularly, the method of the present general inventive concept omits conventional steps of applying a sacrificial layer and polishing the upper surface of the sacrificial layer by CMP, thus simplifying a manufacturing process.

Figure 5:
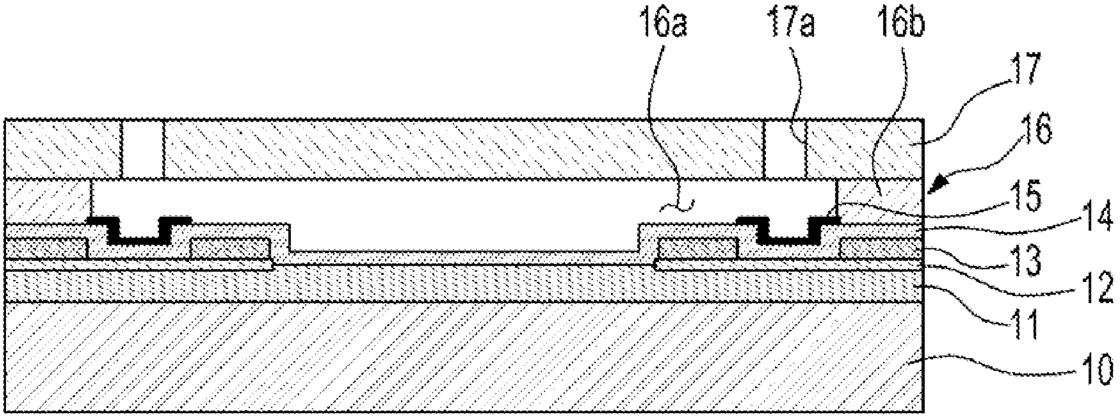

After the exposure of the nozzle layer 17 to light, the chamber layer 16 and the non-exposed regions of the nozzle layer 17 are removed using a developing solution, thus producing the ink chamber 16*a* and the nozzles 17*a*, as shown in FIG. 5. Then, an ink supply hole 18 is formed in the substrate 10 by etching the rear surface of the substrate 10, as shown in FIG. 1.

As apparent from the above description, the present general inventive concept provides a method of manufacturing an inkjet print head, in which a chamber layer is made of a low-speed optical hardening material and a nozzle layer is made of a high-speed optical hardening material, so that no optical reaction of the chamber layer occurs when the nozzle layer is exposed to light. Thus, an ink chamber and nozzles can be uniformly formed.

Further, the method of the present general inventive concept omits conventional steps of applying a sacrificial layer and polishing the upper surface of the sacrificial layer by CMP, thus simplifying a manufacturing process. Thus, it is possible to reduce factors of failure of a product and increase the productivity of the product.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of manufacturing an inkjet print head, the method comprising:

forming a chamber layer using a low-speed optical hardening material on a substrate;

hardening regions of the chamber layer to form a wall of an ink channel by selectively exposing the chamber layer to light;

forming a nozzle layer using a high-speed optical hardening material having a higher optical reaction speed than that of the low-speed optical hardening material, on the chamber layer;

hardening regions of the nozzle layer other than nozzles by selectively exposing the nozzle layer to light; and forming the ink channel and the nozzles by developing the non-exposed regions of the chamber layer and the nozzle layer.

2. The method according to claim 1, wherein:

the chamber layer is formed by a spin coating method using the low-speed optical hardening material in a liquid state; and the nozzle layer is formed by attaching the high-speed optical hardening material in a solid thin film state to the upper surface of the chamber layer.

3. The method according to claim 1, wherein:

the low-speed optical hardening material includes a sensitizer requiring a light exposure amount of 100~400 $mJ/cm^2$ to sensitize the low-speed optical hardening material with a thickness of 1 μm; and the high-speed optical hardening material includes a sensitizer requiring a light exposure amount of approximately 8~23 $mJ/cm^2$ to sensitize the high-speed optical hardening material with a thickness of 1 μm.

4. The method according to claim 1, wherein:

the low-speed optical hardening material is a liquid material including one selected from the group consisting of photosensitive polymide, photosensitive polyamide, and photosensitive epoxy;

the high-speed optical hardening material is a solid material including one selected from the group consisting of photosensitive polymide, photosensitive polyamide, and photosensitive epoxy; and the low-speed optical hardening material and the high-speed optical hardening material have different sensitizer contents.

5. The method according to claim 1, further comprising:

forming an ink supply hole by etching the rear surface of the substrate.

6. The method according to claim 1, further comprising:

forming an insulating layer on the substrate;

forming a heater layer and a lead layer on the insulating layer; and forming a protective layer for protecting the heater layer and the lead layer.

7. The method according to claim 1, wherein:

the low-speed optical hardening material comprises a first sensitizer having a first light exposure amount to sensitize the low-speed optical hardening material with a first thickness; and the high-speed optical hardening material comprises a second sensitizer having a second light exposure amount smaller than the first light exposure amount to sensitize the high-speed optical hardening material with a second thickness.

8. The method according to claim 1, wherein the first thickness and the second thickness are substantially same.

9. The method according to claim 1, wherein the low-speed optical hardening material requires a first energy to sensitize the low-speed optical hardening material with a first thickness; and the high-speed optical hardening material requires a second energy lower than the first energy to sensitize the high-speed optical hardening material with a second thickness.

10. The method according to claim 9, wherein the first thickness and the second thickness are substantially same.

11. The method according to claim 1, wherein the ink channel and the nozzles are formed without forming a sacrificial layer on the chamber layer.

12. The method according to claim 1, further comprising:

hardening regions of the chamber layer to form a wall of the ink channel by selectively exposing the chamber layer to light; and hardening regions of the nozzle layer other than the nozzles by selectively exposing the nozzle layer to light, wherein the selectively exposing of the chamber layer and the selectively exposing of the nozzle layer are prevented from interfering with each other according to characteristics of the low-speed optical hardening material and the high-speed optical hardening material.

13. The method according to claim 1, further comprising:

hardening regions of the chamber layer to form a wall of the ink channel by selectively exposing the chamber layer to light; and hardening regions of the nozzle layer other than the nozzles by selectively exposing the nozzle layer to light, wherein an optical reaction of the chamber layer does not occur when the nozzle layer is exposed to the light.

14. A method of manufacturing an inkjet print head, the method comprising:

forming a chamber layer using a low-speed optical hardening material on a substrate;

forming a nozzle layer using a high-speed optical hardening material having a higher optical reaction speed than an optical reaction speed of the low-speed optical hardening material, on the chamber layer; and forming an ink channel and nozzles on the chamber layer and the nozzle layer.

15. The method according to claim 14, further comprising:

hardening regions of the chamber layer to form a wall of the ink channel by selectively exposing the chamber layer to light.

16. The method according to claim 15, wherein the forming of the ink channel comprises forming the ink channel by developing the chamber layer.

17. The method according to claim 14, further comprising:

hardening regions of the nozzle layer other than the nozzles by selectively exposing the nozzle layer to light.

18. The method according to claim 17, wherein the forming of the nozzles comprises forming the nozzles by developing non-exposed regions of the nozzle layer.

19. The method according to claim 14, wherein the ink channel is formed without forming a sacrificial layer on the chamber layer and without polishing a surface of the sacrificial layer.

20. The method according to claim 14, further comprising:

hardening regions of the chamber layer to form a wall of the ink channel by selectively exposing the chamber layer to light; and hardening regions of the nozzle layer other than the nozzles by selectively exposing the nozzle layer to light, wherein one of the selectively exposing of the chamber layer and the selectively exposing of the nozzle layer does not interfere with the other one of the selectively exposing of the chamber layer and the selectively exposing of the nozzle layer.

* * * * *